United States Patent [19]

Miyamoto

[11] Patent Number: 5,688,090
[45] Date of Patent: Nov. 18, 1997

[54] SCREW ASSEMBLY

[75] Inventor: Saburo Miyamoto, Osaka, Japan

[73] Assignee: Wakai & Co., Ltd., Osaka, Japan

[21] Appl. No.: 698,737

[22] Filed: Aug. 16, 1996

[30] Foreign Application Priority Data

Sep. 11, 1995 [JP] Japan .................. 7-232485

[51] Int. Cl.$^6$ ............................................. F16B 13/06
[52] U.S. Cl. .................................. 411/55; 411/60; 411/73
[58] Field of Search ..................... 411/15, 55, 57, 411/60, 61, 72, 73

[56] References Cited

U.S. PATENT DOCUMENTS 1,476,837  12/1923  Pleister et al. ........................ 411/60
3,893,365  7/1975  Gross ................................. 411/15
3,921,496  11/1975  Helderman .......................... 411/60 X
5,501,557  3/1996  Wakai ............................... 411/55

*Primary Examiner*—Neill R. Wilson
*Attorney, Agent, or Firm*—Wenderoth, Lind & Ponack

[57] ABSTRACT

A screw assembly is made up of a screw and a screw fixing member. The screw fixing member is inserted into a starting hole formed in a concrete wall and then the screw is driven into the fixing member in a continuous manner. The screw fixing member has a body having a cylindrical section formed with an eccentric bore having an opening at one end thereof. The screw has its tip inserted in the opening of the bore. The screw has a threaded shank and a cylindrical portion provided at one end of the shank. The screw and the screw fixing member are coupled together by inserting the cylindrical portion of the screw into the opening of the bore.

2 Claims, 3 Drawing Sheets

FIG. 1A
FIG. 1B
FIG. 1C
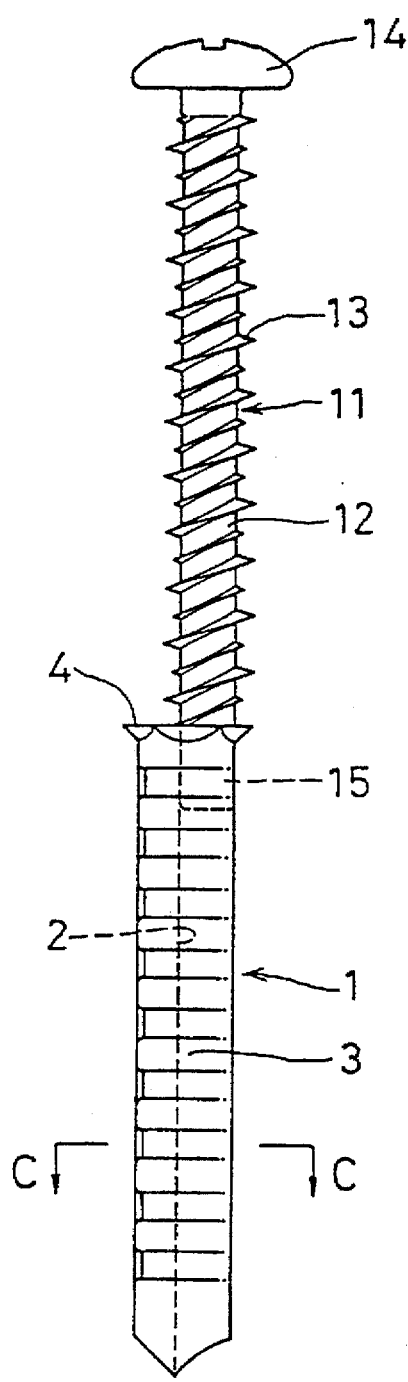
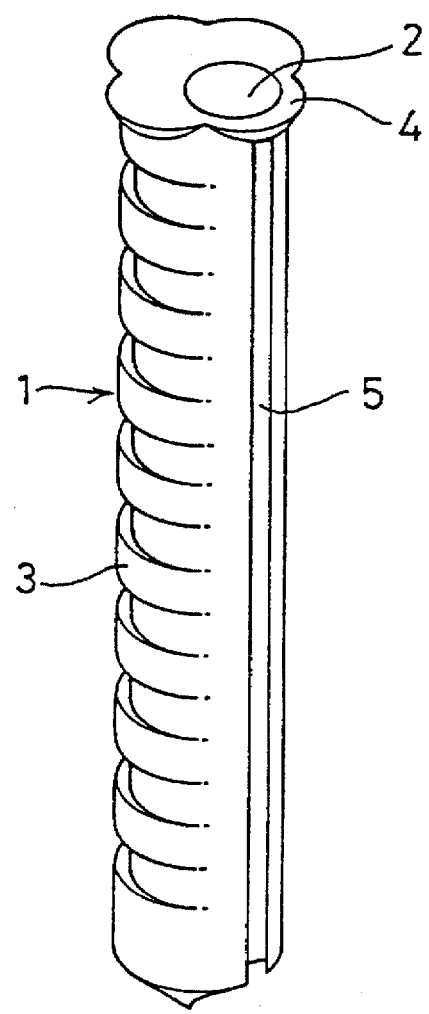
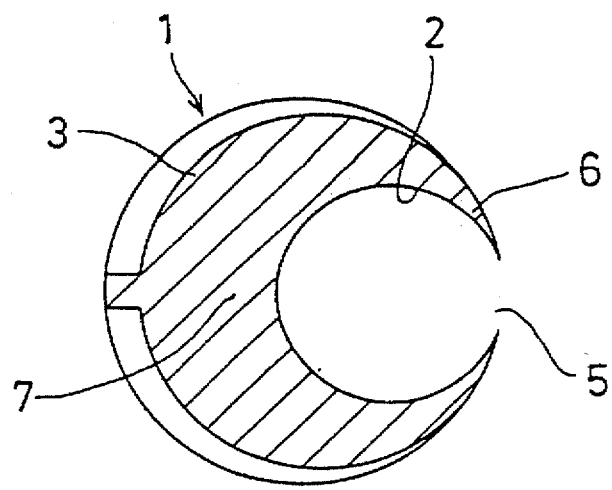

FIG. 2A
FIG. 2B
FIG. 2C
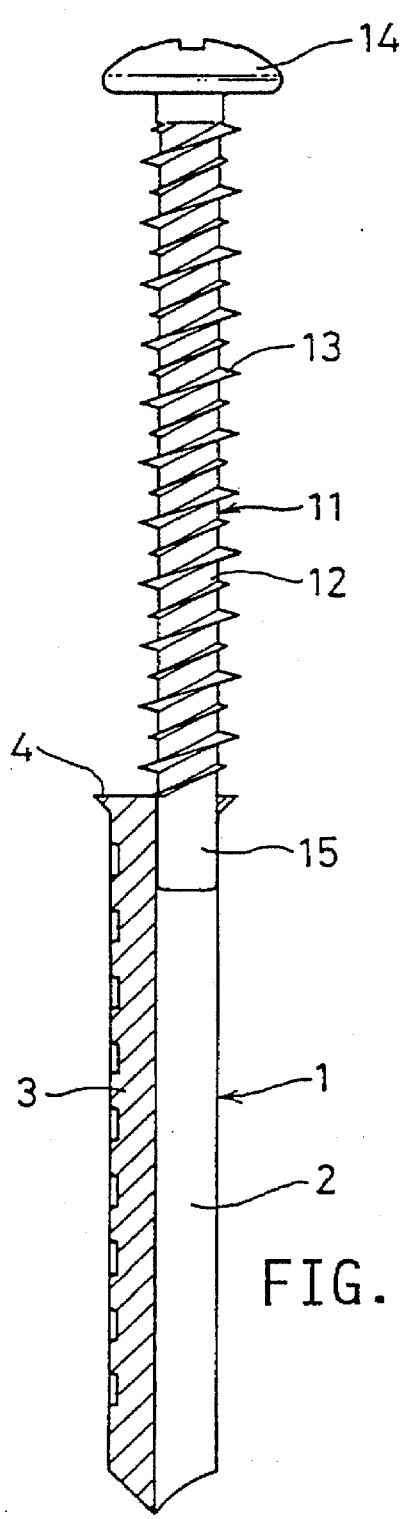
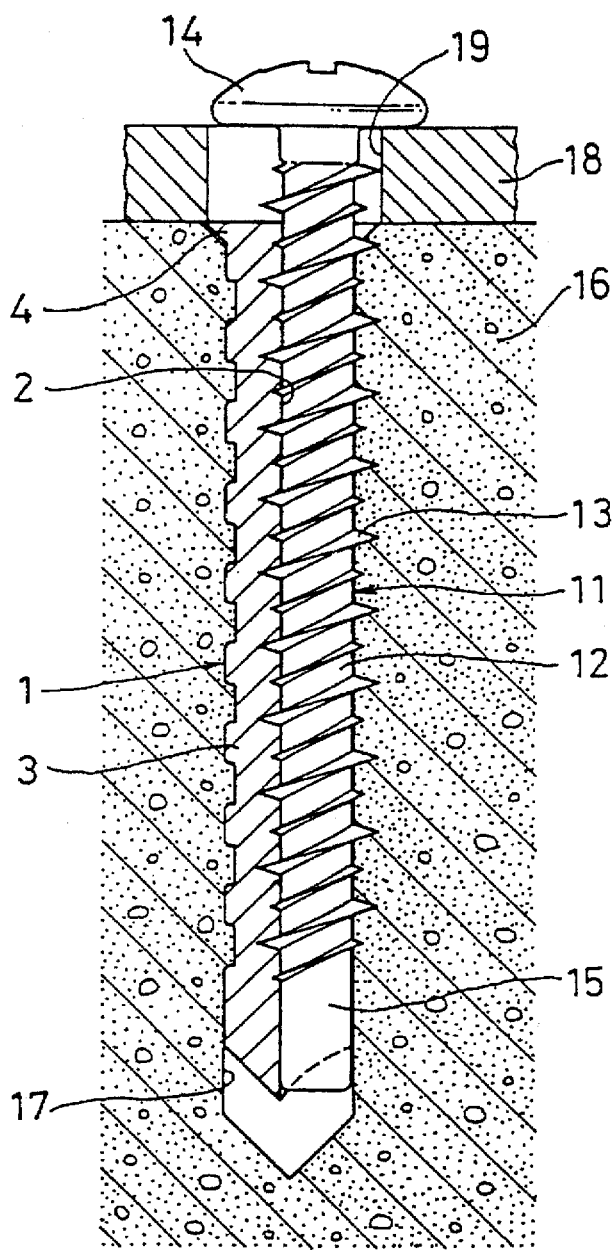
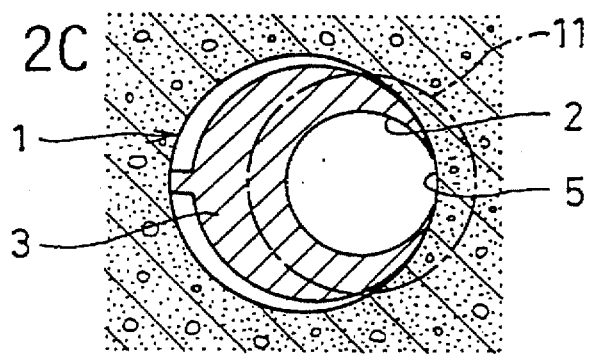

SCREW ASSEMBLY

BACKGROUND OF THE INVENTION

This invention relates to a screw assembly comprising a tapping screw and a screw fixing member and used to fasten various members to concrete or the like.

Heretofore, to fasten various members to concrete, a tapping screw was driven into a starting hole formed in the concrete or into a plug or an anchor buried in the concrete.

When a tapping screw is directly driven into a starting hole formed by drilling, it may slip if the diameter of the starting hole is even slightly larger than the thread diameter of the tapping screw. If the former is too small, it is difficult to drive in the tapping screw.

As shown in FIG. 3, when a tapping screw is driven into a plug or an anchor, the plug 22 or anchor is first inserted in a starting hole 21 formed in a member 31 into which the screw is to be driven, and the screw is then driven into the plug 22 or anchor.

The plug 22 has shoulders 23 to prevent it from being pulled out. It is also formed with a hole 24 extending axially from its one end to its mid-portion. The portion of the plug 22 from its mid-portion to its other end is divided into a plurality of parts by slits 25. By driving a tapping screw into the hole 24, the divided parts defined by the slits 25 will spread apart, preventing the plug 22 and the tapping screw fastened to the plug 22 from coming out of the starting hole 21.

In this arrangement, since the tapping screw is driven into the plug 22 or anchor inserted in a starting hole 21 formed in the member 31 into which the screw is to be driven, the screw is not even partially brought directly into threaded engagement with the member 31. Thus, the plug 22 or anchor tends to turn together with the tapping screw when the latter is initially driven in or when a large torque acts. If this happens, it is impossible to fasten the screw. This happens especially if the member 31 is made of a brittle material.

The plug 22 or anchor, having a thick wall and being considerably larger in diameter than the tapping screw, is costly and makes it necessary to form a large-diameter starting hole using a large-diameter drill. It is troublesome and time-consuming to form such a large starting hole.

In order to solve these problems, the inventors of this invention proposed in Unexamined Japanese Patent Publication 5-103921 a screw fixing member which makes it possible to securely fasten a member of any material to a wall with a tapping screw.

This screw fixing member has a synthetic resin body having a cylindrical section and is formed with an eccentric bore. A head is integrally provided around one end of the body. The screw fixing member is first inserted in a starting hole formed in a concrete wall. Then, by driving a tapping screw into the bore with a screw driver, the threads on the screw will cut through a thin portion of the peripheral wall of the body defined on one side of the eccentric bore and bite into the concrete wall, thus forming female threads on the concrete wall. The threads on the screw also cut into the thick portion of the body, pressing this portion against the concrete wall. The screw is thus fixed in position by biting into both the body of the screw fixing member and the concrete wall.

This conventional screw fixing member is an independent component separate from a screw. To fasten something to a concrete wall, the fixing member alone has to be inserted into a starting hole formed in the concrete wall before driving the separate screw into the bore in the fixing member. Such work is troublesome and time-consuming.

Each screw fixing member has to be combined with a screw having the right diameter and length, which are determined by the inner diameter of the bore and the outer diameter of the body. But since screws and screw fixing members are separate members, fixing members were frequently combined with wrong screws.

When a screw having threads at its tip or a screw having a pointed tip is set in the fixing member, such a screw will easily come off the fixing member, or it will be difficult to maintain directional stability when the fixing member is inserted into a starting hole.

SUMMARY OF THE INVENTION

An object of this invention is to provide a screw assembly comprising a screw and a screw fixing member which makes it possible to insert the screw fixing member into a starting hole formed in a concrete wall and then drive the screw into the fixing member in a continuous manner, and which can avoid the possibility of wrong combinations of screws and screw fixing members.

According to this invention, there is provided a screw assembly comprising a screw fixing member having a body having a cylindrical section and formed with an eccentric bore having an opening at one end thereof, and a screw having its tip inserted in the opening of the bore to couple the screw with the screw fixing member.

The screw fixing member is formed from a synthetic resin or lead and has a head around one end thereof.

BRIEF DESCRIPTION OF THE DRAWINGS

Other features and objects of the present invention will become apparent from the following description made with reference to the accompanying drawings, in which:

FIG. 1A is a front view of a screw assembly;

FIG. 1B is a perspective view of a screw fixing member;

FIG. 1C is an enlarged cross-sectional view taken along line c—c of FIG. 1A;

FIG. 2A is a vertical sectional view of the screw assembly;

FIG. 2B is a vertical sectional view of the same showing its state in use;

FIG. 2C is its cross-sectional view; and

DETAILED DESCRIPTION OF THE PREFERRED EMBODIMENT

Figure 3:
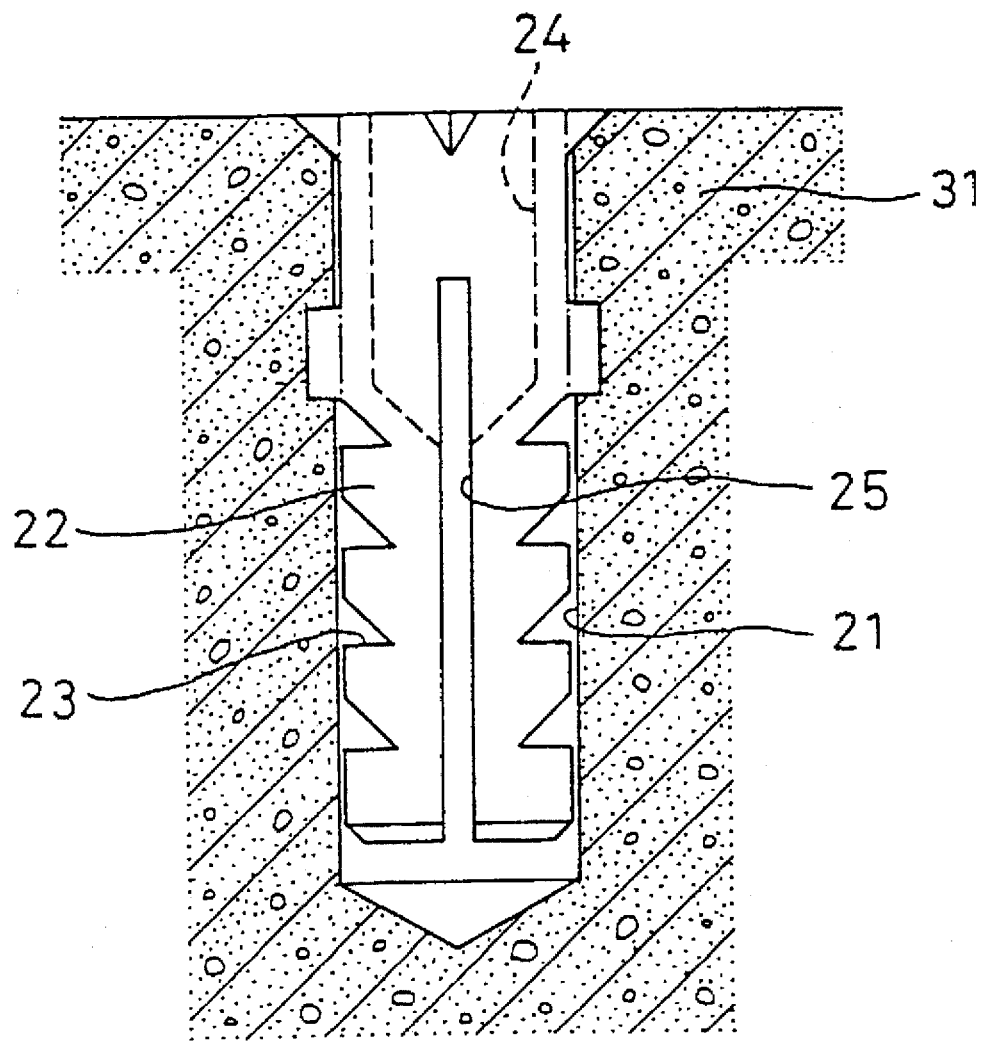
FIG. 3 is a vertical sectional view of a conventional fastening means, i.e. a plug, showing its state in use.

The embodiment of this invention is described with reference to the drawings.

As shown in FIGS. 1A–1C, a screw fixing member 1 has a body 3 which is a synthetic resin or lead member having a cylindrical section and formed with a bore 2. A head 4 having a radially outwardly extending flange is provided at one end of the body 3. A slit 5 is formed in the peripheral wall of the body 3 to extend axially over the entire length of the body.

The bore 2 is offset from the axis of the body 3, so that the peripheral wall of the body 3 has a thin portion 6 and a thick portion 7 disposed opposite to each other on both sides of the axis of the body 3. In the embodiment, the slit 5 is formed in the thin portion 6 of the wall.

In the embodiment, the bore 2 extends through the body 3 over its entire length. But it may be closed at its end remote from the head. Also, the bore 2 may be straight, as shown, or may be tapered toward its tip. If the bore is tapered, the thicknesses of both the thin portion 6 and the thick portion 7 increase gradually toward the tip of the body 3.

The outer diameter of the body 3 and the inner diameter of the bore 2 are determined according to the tapping screw 11 used. In the embodiment, as shown in FIG. 2, the body 3 has a length substantially equal to or longer than the length of a shank 12 of the tapping screw 11, with the bore 2 having an inner diameter substantially equal to the root diameter of male threads 13 of the tapping screw 11 and the thin portion 6 having a thickness slightly smaller than the height of the male threads 13.

In the embodiment, the slit 5 extends over the entire length of the body 3 except the head 4. But the position and the length of the slit 5 are not limited. A plurality of slits 5 may be formed.

The tapping screw 11 comprises the shank 12 formed with the male threads 13 on its outer periphery and a head 14 provided at one end of the shank 12. The shank has a threadless cylindrical portion 15 at the other end.

The cylindrical portion 15, having an outer diameter equal to the root diameter of the male threads 13, is adapted to fit tightly in the bore 2 of the screw fixing member 1. It has to be long enough to keep the screw connected to the screw fixing member 1.

The screw fixing member 1 and the tapping screw 11 are sold as a screw assembly with the cylindrical portion 15 of the tapping screw 11 inserted in the bore 2 of the screw fixing member 1 so that the screw 11 and the screw fixing member 1 are combined in an extended manner, as shown in FIGS. 1A and 2A.

Although the slit 5 is formed in the body 3 of the screw fixing member 1, the cylindrical portion 15 can be held securely in the bore 2 because the head 4 is formed over the entire periphery of the fixing member. It is thus possible to prevent the screw 11 from separating from the screw fixing member and to maintain directional stability when the fixing member is inserted in a starting hole.

We will describe how the screw assembly according to this invention is used, A starting hole 17 having an inner diameter and a depth large enough for the screw fixing member 1 to be inserted is formed by drilling in a concrete wall 16, A hole 19 slightly larger in diameter than the starting hole 17 is formed in a member 18 to be fastened, which is put on the concrete wall 16. The starting hole 17 and the hole 19 may be formed at one time with a drill having a large-diameter portion and a small-diameter portion.

Then, the screw fixing member 1 is inserted through the hole 19 into the starting hole 17 while holding the tapping screw 11 by hand. When the screw fixing member 1 is completely inserted in the starting hole 17, its head 4 abuts the surface of the concrete wall, thus preventing the screw fixing member 1 from dropping into the starting hole 17.

When the screw fixing member 1 is inserted into the starting hole 17, the tapping screw 11, aligned with the screw fixing member 1, protrudes outward from the hole 19.

In this state, by driving the tapping screw 11 into the bore 2 of the screw fixing member 1, which is now inserted in the starting hole 17, with a screw driver, the male threads 13 on the shank 12 of the screw bite into both the inner surface of the body 2 and the inner surface of the starting hole 17 in the concrete wall 16.

By turning the tapping screw 11 with the tip of its shank 12 inserted in the bore 2 at the head, the peripheral wall of the body 3 is quickly spread near the head due to the slit 5 until its outer periphery is pressed against the inner wall of the starting hole 17. By driving in the tapping screw, the head 4 is torn at its portion over the slit 5.

Since the body 3 is pressed hard against the inner wall of starting hole 17, it will never drop into the starting hole, even though it is axially pushed by the tapping screw when it is driven in. Thus, the tapping screw 11 can be smoothly driven into the bore 2.

As the shank 12 of the tapping screw 11 penetrates into the bore 2 while cutting female threads on the inner surface of the bore 2, its male threads 13 will cut through the thin portion 6 of the body 3 and bite into the inner wall of the starting hole 17 of the concrete wall 16, thus forming female threads thereon.

On the other hand, the thick portion 7 of the body 3 is pressed hard against the inner wall of the starting hole 17 in the concrete wall 16 when the male threads 13 cut into the thick portion 7. In this way, the male threads 13 on the tapping screw 11 bite into both the body 3 and the concrete wall 16. Since the male threads 13 are supported resiliently by the thick portion 7, the tapping screw 11 is less likely to slip.

If an instantaneous pulling force acts on the screw after it has been fixed in position, the male threads 13 biting the concrete wall 16 will strongly resist such a pulling force. On the other hand, vibrations and other long-term pulling forces will be resiliently absorbed by the male threads 13 biting the body 3. Overall, the screw assembly according to this invention shows about twice as large a resistance to pulling force as a tapping screw alone when they were driven into the same starting hole.

Since the screw is coupled beforehand to the tubular screw fixing member by inserting the tip of the screw into the fixing member, it is possible to insert the screw fixing member into a starting hole formed in a concrete wall and then drive the screw into the fixing member in a continuous manner. Thus, by using the screw assembly according to this invention, it is possible to fasten an article to a concrete wall with high efficiency.

Also, it is possible to avoid the possibility of wrong combinations of screws and screw fixing members because each screw fixing member is coupled beforehand with a screw of the right size.

What is claimed is:

1. A screw assembly comprising:

a screw fixing member having a body, said body having a cylindrical section and being formed with an eccentric bore having an opening at one end thereof; and a screw having a tip inserted in said opening of said bore to couple said screw with said screw fixing member, wherein said screw has a shank with threads thereon and a cylindrical portion provided at one end of said shank and having a diameter smaller than the diameter of said threads on said shank, said screw and said screw fixing member being coupled together by inserting said cylindrical portion into said opening of said bore.

2. The screw assembly of claim 1, wherein said screw fixing member is formed with a slit in a peripheral wall of said body extending axially from a tip of said screw fixing member.

* * * * *